Sept. 28, 1943.  E. G. HILL ET AL  2,330,424

CLUTCH CONTROL MECHANISM

Filed Dec. 10, 1940  2 Sheets-Sheet 1

Inventors
EDWARD G HILL
HENRY W. HEY

By C. R. Parker
Attorney

Sept. 28, 1943.　　　　E. G. HILL ET AL　　　　2,330,424
CLUTCH CONTROL MECHANISM
Filed Dec. 10, 1940　　　　2 Sheets-Sheet 2

Inventors
EDWARD G. HILL
HENRY W. HEY

Patented Sept. 28, 1943

2,330,424

UNITED STATES PATENT OFFICE 2,330,424

CLUTCH CONTROL MECHANISM

Edward G. Hill and Henry W. Hey, Richmond, Va., assignors to Hill Engineering Corporation, Richmond, Va., a corporation of Virginia Application December 10, 1940, Serial No. 369,498

31 Claims. (Cl. 192—.01)

This invention relates to clutch control mechanisms, and is an improvement over the prior patent of Edward G. Hill, No. 1,964,693, granted June 26, 1934.

In the prior patent referred to, a vacuum motor is employed for effecting disengagement of the vehicle clutch and is controlled by a follow-up valve mechanism whereby the releasing of the accelerator pedal for movement to idling position connects the clutch operating motor to the intake manifold to disengage the clutch, and whereby the depression of the accelerator pedal operates the valve mechanism to admit air into the clutch operating motor to permit the clutch to return to engaged position. The control valve mechanism is of the follow-up type, one of the valve elements being operable by the accelerator pedal and the other valve element being controlled in accordance with increases and decreases in pressure in the clutch operating motor to follow up with respect to the first valve.

Such a mechanism operates very efficiently to provide the smoothest possible clutch engagement under most operating conditions, the control valve mechanism automatically functioning to permit relatively rapid movement of the clutch elements until initial engagement of such elements occurs, whereupon the movement of the clutch elements is checked, that is, either arrested or retarded depending upon the mode of operation of the accelerator pedal. The efficient operation referred to is due to the functioning of the follow-up valve in accordance with pressures in the clutch operating motor. Upon depression of the accelerator pedal, the accelerator-operated valve moves to a position admitting air into the clutch-operating motor whereby the clutch springs immediately start the return movement of the clutch elements toward engaged position. The rate of movement of the clutch elements is dependent upon three elements, namely, the areas of the orifices through which air is admitted into the clutch-operating motor, the area of the pressure movable element of the clutch-operating motor, and the speed of movement of the pressure responsive element. In other words, these three elements determine the rate at which the partial vacuum in the clutch operating motor is satisfied, and the disturbance of either one of these three elements will cause a variation in the pressure in the clutch-operating motor.

The prior construction referred to takes advantage of the foregoing condition by rendering the follow-up valve responsive to pressures in the clutch-operating motor. Upon initial light engagement of the clutch elements one of the conditions referred to is changed, namely, the speed of movement of the pressure responsive element of the clutch-operating motor, movement of the clutch elements being retarded with the immediate result that the valve orifice through which air is being admitted admits air more rapidly in proportion to the area and speed of movement of the pressure responsive element of the motor. When this condition occurs the pressure responsive element of the follow-up valve mechanism immediately moves to a position retarding or cutting off the admission of air into the motor, thus checking the movement of the pressure responsive element of the motor and consequently checking movement of the clutch elements at the point of initial engagement to prevent the grabbing of the clutch elements. Further movement of the accelerator pedal will then advance the valve controlled thereby and again admit air into the clutch operating motor to permit the clutch elements to move into operative engagement.

As previously stated, the prior construction referred to has been found to be very smooth and highly efficient in operation for most shifting operations. However, it is desirable, under some conditions, to cause the checking of the clutch elements to take place slightly before initial engagement to permit the motor to partake of somewhat greater acceleration before actual clutch engagement takes place. This is true, for example, in starting in low and reverse gears from a standstill, and is particularly true in all shifting operations when the motor is cold since under the latter condition the vehicle motor will stall more easily than is true after the motor has warmed up.

An important object of the present invention is to provide an automatic clutch control mechanism wherein checking of the clutch elements normally tends to take place at the point of initial engagement of the clutch elements but wherein means are provided for automatically causing the check point to occur slightly earlier under certain predetermined conditions.

A further object is to provide a clutch control mechanism wherein the check point is caused to occur slightly earlier when the gear set is in first and reverse gears than is true when the gear set is in second or high gear.

A further object is to provide a clutch control mechanism of the character referred to wherein the point at which the clutch elements will be checked when moving toward operative engagement is subject to the control of the automatic choke mechanism of the carburetor so as to cause the checking of the clutch elements to occur slightly earlier in any setting of the gear shift when the motor is cold, thus preventing stalling of the motor by permitting motor acceleration to take place to an extent greater than normally, prior to operative engagement of the clutch elements.

Other objects and advantages of the invention will become apparent during the course of the following description.

In the drawings we have shown one embodiment of the invention. In this showing:

Figure 4 is an enlarged central vertical sectional view through the control valve mechanism, parts being shown in elevation, Figure 5 is an enlarged detail perspective view of the elements of the lever mechanism and associated parts, shown separated, and, Figure 6 is a diagram of the electrical wiring system for the solenoid.

Figure 1:
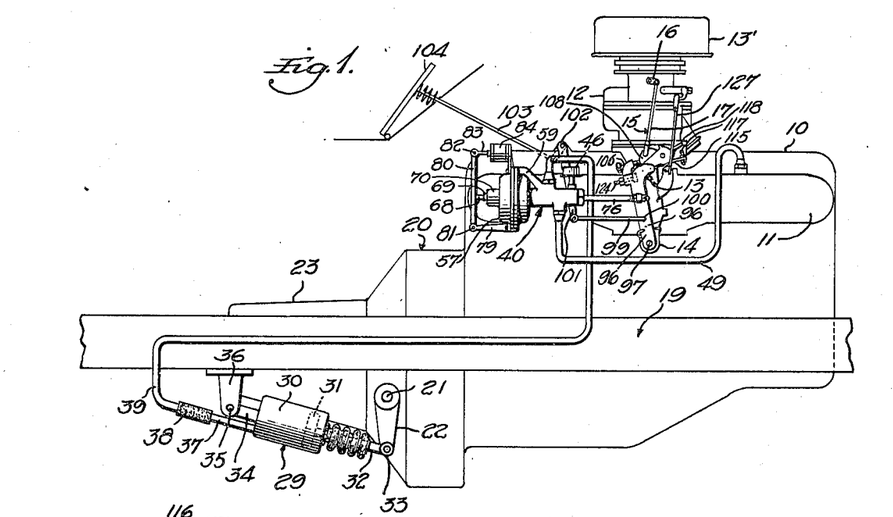
Figure 1 is a side elevation of a motor vehicle power plant showing the invention applied.
Figures 2, 3:
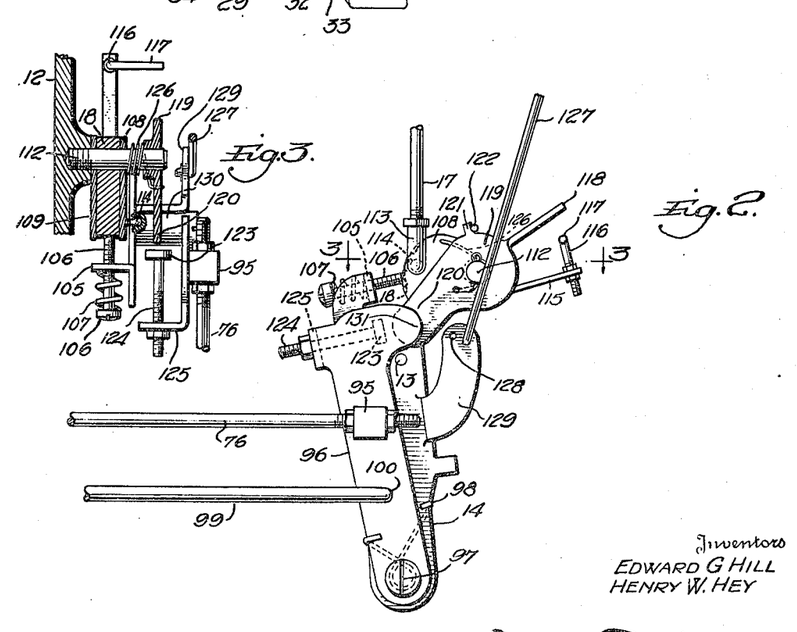
Figure 2 is an enlarged fragmentary side elevation of the lever mechanism associated with the device.
Figure 3 is a section taken on line 3—3 of Figure 2.
Figures 4, 5, 6:
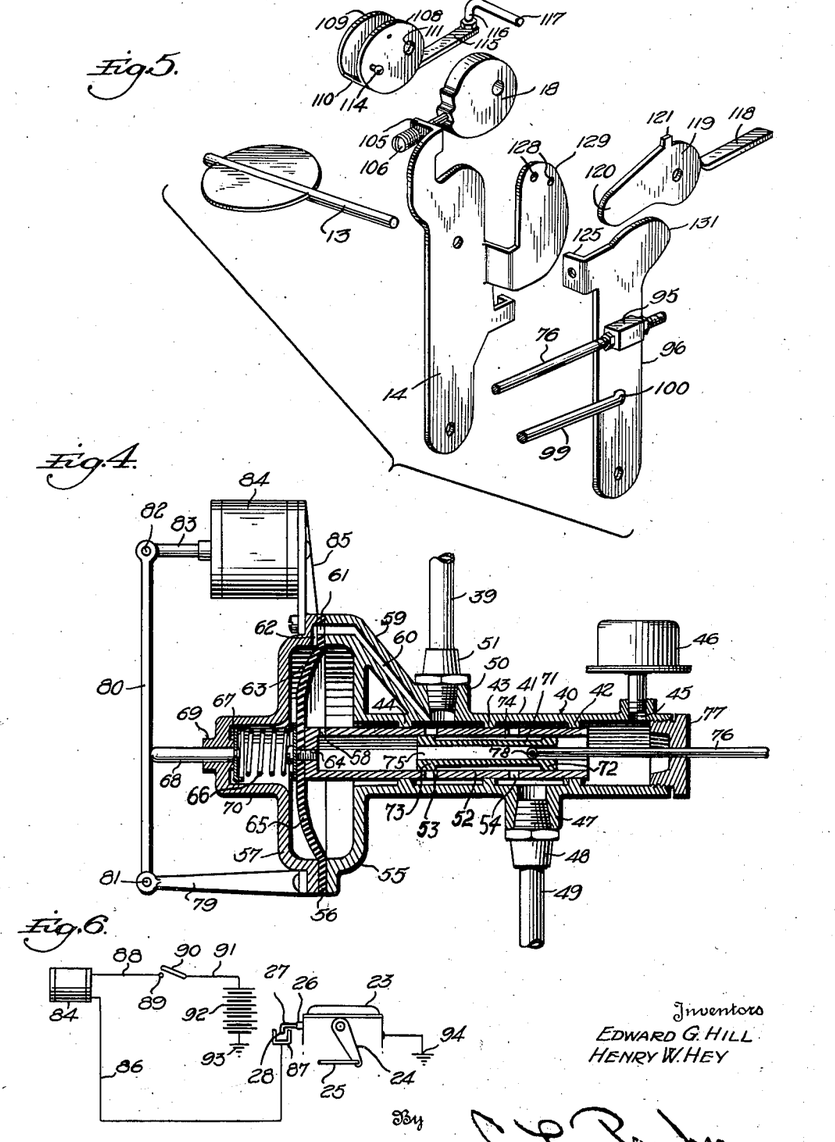

Referring to Figure 1, the numeral 10 designates the motor vehicle engine as a whole having an intake manifold 11 to which fuel is supplied from a carburetor 12 provided at its upper end with the usual air cleaner 13'. The supply of fuel through the carburetor is governed by the usual butterfly throttle mounted on a shaft 13 (Figures 1, 2 and 5). An operating lever 14, to be referred to in detail later, is fixed to the shaft 13 to effect turning movement of the shaft and consequently the throttle valve connected thereto.

The carburetor is provided with the customary automatic choke mechanism indicated as a whole by the numeral 15. Such mechanism comprises the usual choke valve (not shown) operable by a crank 16 to which is connected a rod 17. This rod, in a manner to be described, is connected at its lower end with respect to an idle adjusting cam 18 which is adapted to be moved in a manner to be described to a position for limiting the closing movement of the throttle when the motor is cold, thus causing the motor under such conditions to idle at a somewhat greater speed.

The motor is mounted in the usual vehicle frame structure indicated as a whole by the numeral 19. The rear end of the motor is provided with the usual clutch indicated as a whole by the numeral 20 and provided with the usual clutch elements (not shown) biased to engaged position and adapted to be disengaged upon the rocking of a shaft 21 to which is connected an arm 22. The clutch delivers power from the engine to and through the usual transmission 23 (Figures 1 and 6). This transmission is provided with the usual shiftable elements and is shown as having a crank arm 24 operable manually or by a suitable power mechanism through an operating rod 25. In Figure 6 the transmission has been shown for the purpose of illustration as having a low and reverse gear shift rail 26 and this rail is provided with an axially extending member 27 having a downturned end 28 for a purpose to be described.

A fluid pressure motor indicated as a whole by the numeral 29 (Figure 1) is adapted to be energized to operate the crank 22. The motor 29 comprises a cylinder 30 having a piston 31 therein provided with a piston rod 32 pivotally connected as at 33 to the lower end of the crank 22. The opposite end of the cylinder 30 is pivotally connected through a rigid extension 34 by a pivot 35 to the lower end of a supporting bracket 36. Thus the motor 29 is adapted to swing about the axis of the pivot 35 to permit the axis of the pivot pin 33 to turn about the axis of the shaft 21.

A pipe 37 is connected to the rear or left hand end of the cylinder 30 as shown in Figure 1, the opposite end of this cylinder being open to the atmosphere as will be apparent. The pipe 37 is connected by a flexible hose 38 to one end of a pipe 39 leading to a control valve mechanism indicated as a whole by the numeral 40. This valve mechanism is controlled by movement of the usual accelerator pedal, to be referred to, to connect the rear end of the cylinder 30 to the intake manifold 11 in a manner to be described to effect clutch disengagement, and is adapted to be controlled to admit air into the left hand end of the cylinder 30 to permit the conventional clutch springs to move the clutch elements toward and into operative engagement.

The valve mechanism 40 is quite similar to the valve mechanism shown in the prior patent to Edward G. Hill, No. 1,964,693, referred to above. The valve mechanism comprises a cylindrical body 41 having spaced internal lands 42, 43 and 44 for a purpose to be described. The valve body is provided with a suitable air intake and in the present case such intake has been shown in the form of a port 45 to which air is admitted preferably through a suitable small air cleaner 46.

The valve body 41 is provided with an internally threaded boss 47 for connection through a union 48 with one end of a pipe 49 and the other end of this pipe is connected to the intake manifold 11 as shown in Figure 1. Longitudinally spaced from the boss 47 and preferably diametrically opposite such boss the valve body is provided with a similar boss 50 for reception of a union 51 to which the other end of the pipe 39 is connected.

A tubular valve 52 is arranged in the valve body and is slidable in the lands 42, 43 and 44. The valve 52 is provided with two series of circumferentially spaced openings 53 and 54 as shown in Figure 4. These openings, in a manner to be described, are adapted to selectively control connection of the motor 29 to the intake manifold 11 or to the atmosphere.

The left hand end of the valve body 41, as viewed in Figure 4, is provided with an integral annular cup-shaped enlargement 55 against which is arranged one face of a diaphragm 56. A cup-shaped cap 57 engages against the opposite face of the peripheral portion of the diaphragm 56. The space between the diaphragm 56 and the wall of the member 55 communicates with the interior of the adjacent end of the valve body 41, around the valve 52, and is adapted to communicate at all times with the atmosphere through a port 58 in the valve 52, in a manner to be described. The right hand side of the diaphragm accordingly is always subject to atmospheric pressure. The valve body 41 is provided with an integral portion 59 having a passage 60 therethrough, one end of which communicates with the interior of the boss 50 and the other end of which communicates through an opening 61 in the diaphragm and through a passage 62 in the cap 57, with the space 63 between the daphragm 56 and the cap 57, the space 63 being employed as a pressure chamber in a manner to be described.

The left hand end of the valve 52 is closed and a screw 64 connects the diaphragm 56 to the closed end of the valve 52, a metal washer 65 being arranged against the diaphragm 56 beneath the head of the screw 64. A compression spring 66 has one end engaging the washer 65 and its other end engaging a spring seat 67 carried by a stem 68 slidable in a bearing 69 carried by an axial extension 70 formed integral with the cap 57. The spring seat 67 is shown at its extreme left hand position in Figure 4 and normally occupies such position.

A spool valve 71 is mounted within the sleeve valve 52 and is provided with heads 72 and 73 slidable in the sleeve valve 52. The head 73 normally occupies a position just to the right of the series of ports 53, as shown in Figure 4. It will be apparent that the annular space 74 between the heads 72 and 73 is in constant communication with the intake manifold through the series of openings 54 and through the boss 47 and pipe 49. The openings 54 normally lie just to the left of the land 42 and in the extreme movement of the valve 52 to the left as shown in Figure 4, the openings 54 will never travel as far as the land 43. The openings 54 accordingly are always in communication with the intake manifold.

The spool valve 71 is provided with an axial passage 75 extending therethrough and accordingly the space within the valve 52 to the left of the spool valve 71, as viewed in Figure 4, is always in communication with the atmosphere through the port 45. Movement of the spool valve is accomplished by transmitting movement in a manner to be described through a valve operating stem 76 slidable in a cap 77 threaded in the end of the valve body 41, the inner end of the stem 76 extending into the axial passage 75 and being connected to the spool valve by a pin 78.

Means is provided for moving the stem 68 to compress the spring 66 and thus alter the operation of the valve mechanism for a purpose to be described when the vehicle gear set 23 is in low or reverse gear. A suitable bracket 79 is secured to or formed integral with the cap 57. A lever 80 is pivotally connected at one end as at 81 to the bracket 79 and has its other end pivotally connected as at 82 to the armature 83 of a solenoid 84 supported by a bracket 85 carried by the cap 57. The solenoid 84 is shown in its circuit in Figure 6. One terminal of the solenoid is connected by a wire 86 to a U-shaped contact element 87 the arms of which are selectively engageable by the switch element 28 upon shifting into low or reverse gear. This contact always remains broken and the solenoid 84 deenergized when the low and reverse gear shift rail is in neutral position. The second terminal of the solenoid is connected by a wire 88 to a contact 89 engageable by a switch 90. This switch is connected by a wire 91 to a source of current 92, such as the vehicle battery, and the other terminal of the battery is grounded as at 93. The gear set also is grounded as at 94.

The valve operating rod 76 is connected by a swivel 95 (Figure 2) to an auxiliary lever 96 and the lower end of this lever is pivotally connected as at 97 to the lever 14. A light torsion spring 98 engages the levers 14 and 96 to tend to turn the latter in a clockwise direction as viewed in Figure 2. The lever 96 is adapted to be operated by the usual accelerator pedal. In the installation shown, one end of a rod 99 is pivotally connected as at 100 to the lever 96 and has its other end connected to one arm of a bell crank lever 101 (Figure 1). This bell crank lever is suitably pivotally supported intermediate its ends as at 102 and the other arm of the lever is connected by a rod 103 to a conventional accelerator pedal 104. Depression of the accelerator pedal operates the lever 96 to transmit movement to the spool valve 71 (Figure 4) and the lever 96 cooperates with the lever 14 in a manner to be described to operate the throttle shaft 13.

The throttle-operating lever 14 is provided at its upper end, and above the axis of the shaft 13 with a lateral projection 105 through which passes a screw 106 having its upper end surrounded by a spring 107 to frictionally engage the projection 105 and the head of the screw to tend to prevent the screw from turning from an adjusted position. The screw 105 is a conventional part of an ordinary motor vehicle carburetor, and the screw is engageable with the cam 18 to limit the turning movement of the lever 14 in a clockwise direction toward the throttle closing position, thus determining the idling position of the throttle in accordance with conventional practice.

A pair of plates 108 and 109 are connected by an integral bottom web 110 and straddle the cam 18. These plates are provided with aligned openings 111 to receive a supporting shaft 112 carried by the portion of the carburetor 12 just above the intake manifold. The shaft 112 is fixed and the cam 18 and plates 108 and 109 are free to turn on the shaft 112. The lower end of the rod 17 is provided with a socket 113 to receive a ball 114 (Figure 5) carried by the plate 108. When the motor is cold, the automatic choke mechanism moves the rod 17 upwardly above its normal position, thus turning the plates 108 and 109 in a clockwise direction and causing the web 110 to similarly turn the cam 18. This is the conventional operation for holding the screw 106 in a position to hold the throttle of the engine in a slightly more widely opened position so that the engine will idle at a slightly greater speed. As the engine warms up the rod 17 moves downwardly, and the plates 108 and 109 are free to turn with respect to the cam 18, thus leaving the latter in its previous position until opening movement of the throttle releases the screw 106 from the cam 108, thus permitting the latter to drop into engagement with the web 110.

The web 110 is provided with an elongated extension 115 to the end of which is attached an arm 116 having a horizontally extending portion 117 as shown in Figures 2, 3 and 5. The extended portion 117 is engageable with a finger 118 carried by a disk 119 having a cam 120 for a purpose to be described. The disk 119 is provided adjacent the top thereof with a smaller finger 121 engageable with a stationary pin 122 carried by the carburetor.

The pin 122 limits turning movement of the disk 119 in a clockwise direction as shown in Figure 2, in which position the cam 120 is in its operative position adjacent and in the path of travel of a head 123 carried by a screw 124, as shown in Figures 2 and 3. The screw 124 is carried by a lateral projection 125 formed integral with the lever 96.

The disk 119 is mounted on the shaft 112 and is free to turn thereon, and a light torsion spring 126 has opposite ends engaging the disk 119 and the plate 108 to tend to turn the disk 119 in a clockwise direction to move the cam 120 to the operative position shown in Figure 2. Further turning movement of the cam in a clockwise direction is obviously prevented by the pin 122. As the engine warms up and the choke rod 17 moves downwardly, the arm 116 moves upwardly to engage the finger 118 and thus progressively turn the disk 119 in a counter-clockwise direction to move the cam 120 out of its operative position. When this cam is in its operative position, it limits turning movement of the lever 96 in a clockwise direction about the axis of the pivot pin 97, for a purpose to be described.

In the embodiment of the invention illustrated the carburetor is of the type employing an accelerator pump operated by a rod 127. This rod has its lower end engageable in either of a pair of openings 128 carried by an arm 129 formed integral with and laterally offset from the lever 14. The lever 96 is laterally spaced from the lever 14 by a bushing 130 (Figure 3) to place the lever 96 in a common plane with the arm 129, and the upper end of the lever 96 is provided at its right hand edge as viewed in Figure 2 with a projection 131 adapted to engage the upper end of the arm 129 to limit turning movement of the lever 96 in a clockwise direction about its pivot 97 when such movement is not limited by engagement of the screw head 123 with the cam 120. Obviously the distance between the projection 131 and the nearest point on the arm 129 is greater than the distance between the screw head 123 and the cam 120 when the parts are in the operative position shown in Figure 2. Accordingly it will be apparent that when the vehicle motor is cold, the lever 96 is free to swing in a clockwise direction about the pivot 97 to a less extent than when the vehicle motor is warm since under the latter conditions the lever 96 will swing in the manner described until the projection 131 engages the upper end of the arm 129. These differences in the operation of the lever 96 with respect to the lever 94 are important in the present invention, for reasons which will become apparent.

The operation of the apparatus is as follows:

The present apparatus is intended to take care of certain conditions of vehicle operation which are not entirely satisfactorily taken care of by the structure of the patent to Edward G. Hill, referred to above. The clutch control mechanism of such patent is substantially perfect in operation assuming that the vehicle motor has been fairly well warmed up and assuming that the clutch is being engaged with the gear set in a gear other than first or reverse. The prior construction operates in such manner that under ordinary conditions the releasing of the accelerator pedal results in disengagement of the clutch elements, and when the accelerator pedal is depressed, the clutch elements are permitted to move relatively rapidly to the point of initial engagement at which point they are checked. At the same time, or slightly prior to such time, the depression of the accelerator pedal starts to open the throttle and accelerate the engine.

It is desirable to check the movement of the clutch elements approximately simultaneously with the opening of the vehicle throttle under normal operating conditions, in second and high gears, but this is undesirable when the vehicle is in low or reverse gear and when the vehicle motor is cold since the motor is very easily stalled. The present mechanism automatically takes care of such conditions by checking movement of the clutch elements toward operative engagement prior to engine acceleration, thus permitting engagement of the clutch elements to take place at such motor speed that stalling of the motor is prevented.

Assuming that the vehicle engine has just been started and it is relatively cold, the automatic choke of the carburetor will be in choking position and the rod 17 will be in its upper position as shown in Figure 2. Under such conditions the plates 108 and 109 will be rocked in a clockwise direction from their normal positions and the arm 117 will occupy the position shown in Figure 2 moving away from the finger 118. The torsion spring 126 thus will have turned the cam 120 to its operative position and the web 110 (Figure 5) will have engaged beneath the cam 18 to turn the latter in a clockwise direction from its normal position to hold the screw 106 and hence the lever 14 in such position that the engine throttle will be open sufficiently to cause the engine to operate at a relatively high idling speed.

Under such conditions, and assuming that the accelerator pedal 104 is released, the vehicle clutch will be automatically disengaged. The bell crank lever 101 will be turned to its limit in a clockwise direction and accordingly the rod 99 will be holding the lever 96 in the position shown in Figure 2. The rod 99 will be moved to its extreme left hand position as shown in Figure 1, and the same necessarily is true of the valve operating rod 76. Referring to Figure 4 it likewise will be obvious that the spool valve 71 will be in its extreme left hand position and in such position, both valves 52 and 71 will be moved to the left with the ports 54 adjacent the central land 43 and with the valve head 73 moved relatively across the ports 53 to close communication between these ports and the axial air passage 75 and maintain communication between the ports 53 and the vacuum space 74.

This position of the valves maintains the clutch motor 30 in communication with the intake manifold through pipe 39, ports 53, vacuum space 74, ports 54 and pipe 49. The position of the valve 71 under such conditions will be maintained by the accelerator pedal and its connections while the position of the valve 52 will be maintained by differential pressures on opposite sides of the diaphragm 56, acting against the tension of the spring 66. In this connection, it will be noted that the space to the right of the diaphragm 56 in Figure 4 will be open to the atmosphere through the space to the left of the valve land 44 and through port 58 and air passage 75. The vacuum chamber 63 will be subject to the same reduced pressure present in the shifting motor 30 because of its communication with the source of vacuum through passages 62, 61, 60, etc. Obviously any pressure present in the shifting motor is duplicated in the chamber 63.

With the clutch thus disengaged, the operator will make the shift into low gear, and the switch finger 28 (Figure 6) will engage one arm of the U-shaped contact 87. Assuming that the switch 90 is closed, a circuit will be completed from the battery 92 through wires 91 and 88, through solenoid 84, wire 86 and switch devices 87, 28, 27 and thence to ground 94 and from ground 93 back to the battery.

Referring to Figure 4, it will be obvious that energization of the solenoid 84 moves the upper end of the lever 80 to the right, thus pushing inwardly on the stem 68 and compressing the spring 66 for any given position of the sleeve valve 52. In other words, this operation increases the loading of the spring 66 and thus increases the tendency for the valve 52 to move to the right as viewed in Figure 4 with respect to the valve 71. Stated in a different way, the increased loading of the spring 66 increases the differential pressures necessary on opposite sides of the diaphragm 56 to hold the valve 52 in any given position, and for given differential pressure on opposite sides of the diaphragm 56, the valve 52 will be arranged further to the right when the solenoid 84 is energized than when the solenoid is de-energized. This fact is taken advantage of to retard movement of the clutch elements toward engaged position to permit vehicle engine acceleration to take place prior to clutch engagement, and it will become apparent that this is true whether the motor is cold or is operating at its proper temperature for efficiency.

When the operator depresses the accelerator pedal, the rod 103 turns the bell crank lever 101 in a counter-clockwise direction to swing the lever 96 in a clockwise direction about the pivot 97, and this movement of the lever 96 takes place independently of the lever 14, under the conditions being considered, until the screw head 123 engages the cam 120. During such operation, movement will be transmitted to the spool valve 71 through the stem 76, the valve 71 moving to the right as viewed in Figure 4 to close communication between the ports 53 and vacuum space 74 and open communication between the ports 53 and the air passage 75. As air is admitted into the pipe 39 and thus into the motor 30, the conventional clutch springs (not shown) tend to move the clutch elements toward operative engagement, the shaft 21 (Figure 1) being turned in a counter-clockwise direction. The increase in pressure in the clutch motor is duplicated in the chamber 63 (Figure 4) thus reducing differential pressures affecting the diaphragm 56 whereby the spring 66 moves the valve 52 toward the right to tend to move the ports 53 to a position wherein they will be closed by the valve head 73. If this position is reached, the admision of air into the motor 30 will be cut off and movement of the clutch elements will be arrested. If movement of the accelerator pedal is continued, the valve 71 will continue to move to the right (Figure 4) thus tending to maintain the ports 53 open to the atmosphere, under which conditions admission of air into the motor 30 and into the diaphragm chamber 63 will continue. Under such conditions, the valve 52 obviously will continue to move to the right as viewed in Figure 4.

It will be obvious that through the mechanism referred to, a follow-up action is provided between the valves 52 and 71, and it will become apparent that this is true both in the clutching and de-clutching operations. Up to the point where the screw head 123 (Figure 2) engages the cam 120, movement of the valves described causes progressive releasing of the clutch elements toward initial engagement without any movement being transmitted to the throttle-operating lever 14. When the head 123 (Figure 2) contacts the cam 120, further movement of the accelerator pedal will be prevented from turning the lever 96 about the pivot 97, movement of the upper end of the lever 96 being arrested by the cam 120. Continued movement of the lever 96 by the accelerator pedal operated rod 99 will then effect turning movement of the lever 14 to open the throttle, the lever 96 fulcruming about the point of contact between the head 123 and cam 120.

It will be noted that prior to the point at which the head 123 contacts the cam 120, the lever length between the swivel 95 and pivot 97 is substantially double the lever length between the pivot 100 and pivot 97. During such time, movement of the valves 71 and 52 will be relatively rapid as compared with the accelerator-operated rod 99. After the head 123 engages the cam 120, it will be obvious that movement not only will be transmitted to the throttle lever, but the valve-operating rod 76 will move relatively more slowly for a given movement of the rod 99 since the lever strength between the swivel 95 and the fulcrum point between the head 23 and cam 120 will be materially less than the lever length between such fulcrum point and the pivot 100. Thus the clutch elements will move more slowly toward operative engagement.

The point at which slower clutch movement starts to take place, namely, when the head 123 engages the cam 120, occurs prior to the point at which initial clutch engagement takes place, and accordingly it will be obvious that the throttle lever 14 will open the throttle to accelerate the engine speed prior to clutch engagement, thus preventing the stalling of the motor. It also will be apparent that the increased loading of the spring 66 (Figure 4) by energization of the solenoid 84 causes the valve 52 to overrun with respect to the valve 71 to cut off the admission of air to the motor 30 through the ports 53 earlier than would be true if the solenoid 84 were not energized. Accordingly there is a lagging of the movement of the clutch elements toward operative engagement when the vehicle is in low gear, due to the energization of the solenoid 84. Thus when the vehicle motor is cold, and the clutch is being engaged with the gear set in low gear, the check point of the clutch elements occurs prior to engine acceleration, thus permitting such acceleration to take place before the clutch elements engage. It also will be apparent that such engagement of the clutch elements is caused to lag and the two results referred to insure smooth clutch engagement without any stalling of the vehicle motor.

Reference to the "checking" of the clutch elements should not be confused with prior clutch control mechanisms wherein there was a definite retarding or arresting of the movement of the clutch elements at the point of initial engagement, as in the structure of the prior patent to Edward G. Hill, referred to above. The control valve mechanism of the present construction is similar in its operation to that of the patent referred to in that there will be a checking of the clutch elements at the point of initial engagement due to the functioning of the diaphragm 56. It will be obvious that the rate of movement of the clutch elements toward operative position is dependent upon three factors, namely, the area of the piston 31 (Figure 1) the speed of movement of this piston, and the area of the orifice through which air is admitted into the motor cylinder 30. These three elements determine the pressure in the vacuum end of the cylinder 30 and consequently govern the speed of movment of the piston 31.

Assuming that the accelerator pedal is depressed at a uniform rate, the three conditions referred to will remain constant until initial engagement of the clutch elements takes place, disregarding of course, the functioning of the lever mechanism shown in Figure 5. Whenever initial engagement of the clutch elements takes place, movement of the piston 31 will be slightly retarded, in which case there will be an immediate rise in pressure in the cylinder 30, and this pressure will be communicated to the vacuum chamber 63 (Figure 4) and the increase in pressure in this chamber will move the diaphragm 56 toward the right to block off the admission of air into the cylinder 30 and thus check movement of the clutch elements into operative engagement. This result takes place under any conditions when light initial clutch engagement takes place, as is true in the structure of the Hill patent referred to.

However, there is a second operation, previously referred to which may be considered in the nature of a "checking" operation. Initial movement of the accelerator pedal from idling position, for the reasons stated, provides relatively rapid movement of the rod 76 (Figures 2 and 4) during movement of the lever 96 independently of the lever 14, and during this period the clutch elements will move more rapidly toward initial engagement than after movement of the lever 96 independently of the lever 14 is stopped. For a uniform rate of movement of the accelerator pedal downwardly, therefore, the clutch elements will move relatively rapidly toward initial engagement and then relatively more slowly after the lever 96 picks up the lever 14. Therefore it may be considered that there are two "checking" functions of the apparatus, that which occurs when the lever 96 picks up the lever 14 and that which occurs upon initial engagement of the clutch elements. This provides a very fast clutch engagement but insures against grabbing of the clutch elements.

The shift into low gear is accomplished in the manner described above and regardless of the vehicle motor operation, the energization of the solenoid 84 causes the valve 52 (Figure 4) to tend to overrun with respect to the valve 71 to thus restrict the flow of air through ports 53 and insure vehicle motor acceleration to a degree necessary for low gear engagement without stalling the motor. When the motor is cold, the cam 120 limits movement of the lever 96 independently of the lever 14, thus causing the latter to be picked up at an earlier point to insure greater vehicle motor acceleration prior to operative clutch engagement. The present device, therefore, renders it impossible to stall the motor when starting from a standstill in low gear, regardless of whether the start is being made when the vehicle motor is cold or when it is at a normal operating temperature.

When the shift is to be made in second gear, it merely is necessary for the operator to release the accelerator pedal, whereupon the lever 14 will return to its idling position with the screw 106 in engagement with the cam 18, after which the lever 96 will swing in a counter-clockwise direction about the pivot 97 to its normal position shown in Figure 2.

This operation causes the valve rod 76 to be moved to the left as viewed in Figure 4, whereupon the valve head 73 will close the ports 53 to the atmosphere and open them to the vacuum space 74. The clutch motor 29 thus will be connected to the manifold 11 and the piston 31 will start to move to the left as viewed in Figure 1. The vacuum established in the clutch motor will be duplicated in the chamber 63 (Figure 4) to move the sleeve valve 52 toward the left in a follow-up operation. If the spool valve 71 continues to move toward the left as viewed in Figure 4, the clutch motor will be maintained in communication with the intake manifold and the clutch will be disengaged.

After clutch disengagement, the operator will shift into second gear and then depress the accelerator pedal, whereupon the functions of clutch engagement will be carried out in exactly the same manner as described for low gear, except that in second gear the circuit will be broken through the solenoid 84 and the spring 66 (Figure 4) will resume its normal length and exert its normal tension against the diaphragm 65, thus preventing the valve 52 from tending to overrun the valve 71 to the extent that is true in the low gear shift, the engagement of the clutch elements in second gear being permitted to take place earlier than is true in low gear without stalling the motor. The same operation, of course, takes place when the shift is made into high gear.

When the vehicle motor is cold, however, the cam 120 (Figure 2) functions in second and high gear in exactly the same manner as in low gear to limit movement of the lever 96 independently of the lever 14, thus retarding the rate of movement of the spool valve 71 and consequently the rate of movement of the clutch elements into engagement. Thus when the vehicle motor is cold, the cam 120 functions to prevent the stalling of the motor when clutch engagement takes place in any gear.

The shift into reverse takes place with the present clutch control mechanism functioning in exactly the same manner as for low gear. It will be apparent that the contacts 28 and 87 are in engagement in both low and reverse gears, and when the gear set is in either of such gears the spring 66 (Figure 4) has its load increased to cause the valve 52 to tend to overrun the valve 71 to provide a slower clutch engagement when the vehicle is being started from a standstill in either low or reverse gears.

As the vehicle motor warms up, the rod 17 (Figures 1 and 2) will start to move downwardly and will turn the plates 108 and 109 in a counter-clockwise direction in accordance with conventional practice. The connecting web 110 (Figure 5) will start to move downwardly away from the bottom portion of the cam 18, and this cam being free to turn by gravity will remain in its previous position only so long as it is held in such position by the screw 106 when the accelerator pedal is in idling position. Depression of the accelerator pedal, as the motor warms up, permits the cam 18 to turn in a counter-clockwise direction whereby each releasing of the accelerator pedal will result in the screw 106 moving further to the right in Figure 2 before being stopped, thus progressively reducing the idling speed of the vehicle engine.

As the vehicle motor warms up and the plates 108 and 109 turn in a counter-clockwise direction, the stem 116 and arm 117 (Figures 2 and 5) will move upwardly and will engage the arm 118 and turn the disk 119 against the tension of the light torsion spring 126. As the motor warms up, this operation continues until the cam 120 is turned downwardly to such position that it will no longer be engaged by the screw head 123 to limit movement of the lever 96 independently of the lever 14. This operation, of course, takes place progressively and successive depressions of the accelerator pedal will result in the lever 96 moving progressively further to the right in Figure 2 before engaging the cam 120. The point finally will be reached in which the screw head 123 will no longer engage the cam 120. This point is reached when the motor vehicle engine reaches a predetermined temperature near its normal operating temperature. After this point is reached, the projection 131 will engage the upper end of the arm 129 upon each depression of the accelerator pedal, to limit turning movement of the lever 96 independently of the lever 14. Thus it will be apparent that after the motor has warmed up, the range of rapid movement of the valve 71 (Figure 4) will be increased, thus speeding up clutch engagement.

It will be obvious that the point at which the lever 96 picks up the lever 14, when the motor is cold and the cam 120 is in the operative position shown in Figure 2, readily may be varied by adjusting the position of the screw head 123. It also will be apparent that the device may be designed to provide whatever pick-up point may be desired between the projection 131 and arm 129. It will be noted that the stem 116 is threaded to permit the adjustment of the point at which the arm 117 will engage the finger 118 to turn the cam 120 downwardly as the engine warms up.

Attention is invited to the fact that an annular space is provided around the valve 52 between the lands 42 and 43 and a similar annular space 74 is provided around the valve 71. Differential pressures, therefore, are prevented from exerting any transverse forces against either of the valves 52 or 71, and accordingly these valves move very freely with respect to each other without any tendency to bind.

From the foregoing it will be apparent that the present construction provides a highly efficient mechanism for controlling the clutches of motor vehicles, smooth and accurate clutch engagement being provided under all operating conditions and the time required for clutch engagement being reduced to a minimum. More rapid clutch engagement is provided for when the vehicle gear set is in second or high gears and slower clutch engagement being provided in low and reverse gears to prevent stalling of the vehicle motor when the car is being started in either direction from a standstill. The choke control mechanism provides for slower clutch engagement and earlier engine acceleration when the vehicle motor is cold, regardless of the position of the gear shift.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A clutch control mechanism for a motor vehicle power plant including an engine, a clutch, a carburetor, a throttle and an accelerator pedal, comprising a power device connected to said clutch, a control mechanism for said power device, connections between said accelerator pedal and said throttle and said control mechanism, said connections being constructed and arranged to at least partially deenergize said power device through said control mechanism upon initial depression of the accelerator pedal and prior to the opening of the engine throttle, to release the clutch elements for movement toward operative engagement, means constructed and arranged to be automatically operated under predetermined conditions, and means for utilizing operation of said last named means for causing said accelerator pedal to initially open said throttle at an earlier point with relation to the initial depression of the accelerator pedal from its fully released position.

2. A clutch control mechanism for a motor vehicle power plant including an engine, a clutch, a carburetor, a throttle and an accelerator pedal, comprising a power device connected to said clutch, a control mechanism for said power device, connections between said accelerator pedal and said throttle and said control mechanism, said connections being constructed and arranged to at least partially deenergize said power device through said control mechanism upon initial depression of the accelerator pedal and prior to the opening of the engine throttle, to release the clutch elements for movement toward oprative engagement, and means responsive to temperatures of the vehicle engine to cause said connections to initially open said throttle at an earlier point with relation to initial depression of the accelerator pedal from its fully released position.

3. A clutch control mechanism for a motor vehicle power plant including an engine, a clutch, a carburetor having a throttle, an automatic temperature-controlled choke mechanism, and an accelerator pedal, comprising a power device connected to the clutch, control mechanism for said power device, connections between said accelerator pedal and said throttle and said control mechanism, said connections being constructed and arranged to at least partially deenergize said power device through said control mechanism upon initial depression of the accelerator pedal and prior to the opening of the throttle, to release the clutch elements for movement toward operative engagement, and means controlled by said automatic choke mechanism for changing the mechanical relationship in the connections between the accelerator pedal and the throttle to cause the latter to be opened to initiate engine acceleration prior to the engagement of the clutch elements.

4. A clutch control mechanism for a motor vehicle power plant including an engine, a clutch, a transmission, a carburetor, a throttle and an accelerator pedal, comprising a power device connected to the clutch, a follow-up control mechanism for said power device, connections between said accelerator pedal and said throttle and said control mechanism, said connections being constructed and arranged to at least partially deenergize said power device through said control mechanism upon initial depression of the accelerator pedal and prior to the opening of the engine throttle, to release the clutch elements for movement toward operative engagement, and means operative through said control mechanism when the transmission is in a predetermined gear relation for causing a relatively retarded engagement of the clutch elements with respect to initial opening of the throttle upon depression of the accelerator pedal from its released position.

5. A clutch control mechanism for a motor vehicle power plant, including an engine, a clutch, a carburetor, a throttle and an accelerator pedal, comprising a differential fluid pressure operated power device connected to the clutch, a control valve mechanism for said power device, connections between said accelerator pedal and said throttle and said control valve mechanism, said connections being constructed and arranged to connect said power device to a source of differential fluid pressure upon the releasing of the accelerator pedal to release the clutch and to at least partially deenergize said power device upon initial depression of the accelerator pedal and prior to the opening of the engine throttle, to release the clutch elements for movement toward operative engagement, means constructed and arranged to be automatically operated under predetermined conditions, and means for utilizing operation of said last named means for causing said accelerator pedal to initially open said throttle at an earlier point with relation to the depression of the accelerator pedal from its released position.

6. A clutch control mechanism for a motor vehicle power plant, including an engine, a clutch, a carburetor, a throttle and an accelerator pedal, comprising a differential fluid pressure operated power device connected to the clutch, a control valve mechanism for said power device, connections between said accelerator pedal and said throttle and said control valve mechanism, said connections being constructed and arranged to connect said power device to a source of differential fluid pressure upon the releasing of the accelerator pedal to release the clutch and to at least partially deenergize said power device upon initial depression of the accelerator pedal and prior to the opening of the engine throttle, to release the clutch elements for movement toward operative engagement, and means responsive to temperatures of the vehicle engine to cause said connections to initially open said throttle at an earlier point with relation to initial operation of said valve mechanism upon depression of the accelerator pedal from its released position.

7. A clutch control mechanism for a motor vehicle power plant including an engine, a clutch, a carburetor having an automatic temperature-controlled choke mechanism, and an accelerator pedal, comprising a differential fluid pressure operated power device connected to the clutch, a control valve mechanism for said power device, connections between said accelerator pedal and said throttle and said control mechanism, said connections being constructed and arranged to connect said power device to a source of differential fluid pressure through said control valve mechanism to release the clutch upon the releasing of the accelerator pedal, and to at least partially deenergize said power device upon initial depression of the accelerator pedal and prior to the opening of the throttle, to release the clutch elements for movement toward operative engagement, and means controlled by said automatic choke mechanism for changing the mechanical relationship in the connections between the accelerator pedal and the throttle to cause the latter to be opened to initiate engine acceleration after initial depression of the accelerator pedal and prior to the engagement of the clutch elements.

8. A clutch control mechanism for a motor vehicle power plant including an engine, a clutch, a transmission, a carburetor, a throttle and an accelerator pedal, comprising a differential fluid pressure operated power device connected to the clutch, a follow-up control valve mechanism for said power device, said accelerator pedal and said throttle and said control valve mechanism being so connected to each other as to connect said power device to a source of differential pressure through said valve mechanism upon the releasing of the accelerator pedal to release the clutch elements, and to disconnect said power device from said source and connect it to the atmosphere through said valve mechanism to release the clutch elements for movement toward operative engagement upon initial depression of the accelerator pedal and prior to the opening of the engine throttle, and means automatically operative when the transmission is in a predetermined gear relation for controlling the follow-up action of said valve mechanism to provide a relatively restricted communication between said power device and the atmosphere to effect a relative lagging of the clutch elements toward operative engagement upon depression of the accelerator pedal from its released position.

9. A clutch control mechanism for a motor vehicle power plant including an engine, a clutch, a transmission, a carburetor, a throttle and an accelerator pedal, comprising a differential fluid pressure operated power device connected to the clutch, a control valve mechanism for said power device, connections between said accelerator pedal and said throttle and said control valve mechanism, said connections being constructed and arranged to connect said power device to a source of differential pressure through said valve mechanism upon the releasing of the accelerator pedal to release the clutch elements, and to disconnect said power device from said source and connect it to the atmosphere through said valve mechanism to release the clutch elements for movement toward operative engagement upon initial depression of the accelerator pedal and prior to the opening of the engine throttle, means automatically operative when the transmission is in a predetermined gear relation for causing said valve mechanism to provide a relatively restricted communication between said power device and the atmosphere to effect a relative lagging of the clutch elements toward operative engagement upon depression of the accelerator pedal from its released position, means operable under predetermined conditions and independently of said last named means, and means for utilizing operation of said last named means for causing said accelerator pedal to initially open said throttle at an earlier point with relation to the initial depression of the accelerator pedal from its released position.

10. A clutch control mechanism for a motor vehicle power plant including an engine, a clutch, a carburetor, a throttle and an accelerator pedal, comprising a power device connected to the clutch, a control mechanism for said power device, motion transmitting means between said accelerator pedal and said control mechanism whereby said power device will be energized to release the clutch upon releasing of the accelerator pedal and will be deenergized to release the clutch elements for movement toward operative engagement upon depression of the accelerator pedal from its released position, lost motion means connecting said motion transmitting means to said throttle whereby the latter will be operable by said accelerator pedal and whereby said accelerator pedal will operate said control mechanism in a limited range of movement between the idling position of the throttle and the fully released position of the accelerator pedal, and means constructed and arranged to be responsive to a condition wholly extraneous to said lost motion means for altering the length of said limited range of movement.

11. A clutch control mechanism for a motor vehicle power plant including an engine, a clutch, a carburetor, a throttle and an accelerator pedal, comprising a power device connected to the clutch, a control mechanism for said power device, motion transmitting means between said accelerator pedal and said control mechanism whereby said power device will be energized to release the clutch upon releasing of the accelerator pedal and will be deenergized to release the clutch elements for movement toward operative engagement upon depression of the accelerator pedal from its released position, lost motion means connecting said motion transmitting means to said throttle whereby the latter will be operable by said accelerator pedal and whereby said accelerator pedal will operate said control mechanism in a limited range of movement between the idling position of the throttle and the fully released position of the accelerator pedal, and means constructed and arranged to be responsive to a condition wholly extraneous to said lost motion means for altering the length of said limited range of movement, said motion transmitting means and said lost motion means being constructed and arranged with respect to each other whereby a given rate of movement of the accelerator pedal will cause a greater rate of movement of said control mechanism during said range of movement of the accelerator pedal than during movement of said throttle.

12. A clutch control mechanism for a motor vehicle power plant including an engine, a clutch, a carburetor, a throttle and an accelerator pedal, comprising a power device connected to the clutch, a control mechanism for said power device, motion transmitting means between said accelerator pedal and said control mechanism whereby said power device will be energized to release the clutch upon releasing of the accelerator pedal and will be deenergized to release the clutch elements for movement toward operative engagement upon depression of the accelerator pedal from its released position, lost motion means connecting said motion transmitting means to said throttle whereby the latter will be operable by said accelerator pedal and whereby said accelerator pedal will operate said control mechanism in a limited range between the idling position of the throttle and the fully released position of the accelerator pedal, means constructed and arranged to be responsive to changeable predetermined conditions, and means for utilizing operation of said last named means for reducing said range of movement of the accelerator pedal whereby initial opening movement will be transmitted to said throttle at an earlier point with relation to initial depression of the accelerator pedal from its released position.

13. A clutch control mechanism for a motor vehicle power plant including an engine, a clutch, a carburetor, a throttle and an accelerator pedal, comprising a power device connected to the clutch, a control mechanism for said power device, motion transmitting means between said accelerator pedal and said control mechanism whereby said power device will be energized to release the clutch upon releasing of the accelerator pedal and will be deenergized to release the clutch elements for movement toward operative engagement upon depression of the accelerator pedal from its released position, lost motion means connecting said motion transmitting means to said throttle whereby the latter will be operable by said accelerator pedal and whereby said accelerator pedal will operate said control mechanism in a limited range between the idling position of the throttle and the fully released position of the accelerator pedal, said motion transmitting means and said lost motion means being constructed and arranged with respect to each other whereby a given rate of movement of the accelerator pedal will cause a greater rate of movement of said control mechanism during said range of movement of the accelerator pedal than during movement of said throttle, means constructed and arranged to be responsive to changeable predetermined conditions, and means for utilizing operation of said last named means for reducing said range of movement of the accelerator pedal whereby initial opening movement will be transmitted to said throttle at an earlier point with relation to initial depression of the accelerator pedal from its released position.

14. A clutch control mechanism for a motor vehicle power plant including an engine, a clutch, a carburetor, a throttle and an accelerator pedal, comprising a power device connected to said clutch, a control mechanism for said power device, a throttle lever fixed to said throttle, a control lever pivoted to said throttle lever and connected to said accelerator and to said control mechanism, said control lever being adapted to operate said control mechanism upon the releasing of the accelerator pedal to energize said power device and release the clutch, said control lever having limited free movement with relation to said throttle lever upon initial depression of the accelerator pedal and being engageable when its movement is limited, to turn said throttle lever, means constructed and arranged to be responsive to changeable predetermined conditions, and means for utilizing operation of said last named means for further limiting independent movement of said control lever to turn said throttle lever at an earlier point with respect to depression of the accelerator pedal from its released position.

15. A clutch control mechanism for a motor vehicle power plant including an engine, a clutch, a carburetor, a throttle and an accelerator pedal, comprising a power device connected to said clutch, a control mechanism for said power device, a throttle lever fixed to said throttle, a control lever pivoted to said throttle lever and connected to said accelerator and to said control mechanism, said control lever being adapted to operate said control mechanism upon the releasing of the accelerator pedal to energize said power device and release the clutch, said control lever having limited free movement with relation to said throttle lever upon initial depression of the accelerator pedal and being engageable when its movement is limited to turn said throttle lever, and means responsive to temperatures of the vehicle engine and including an element movable when the engine is relatively cold to further limit free movement of said control lever relative to said throttle lever to effect initial turning movement of the latter at an earlier point with relation to initial depression of the accelerator pedal from its released position.

16. A clutch control mechanism for a motor vehicle power plant including an engine, a clutch, a carburetor, a throttle and an accelerator pedal, comprising a power device connected to said clutch, a control mechanism for said power device, a throttle lever fixed to said throttle, a control lever pivoted to said throttle lever and connected to said accelerator and to said control mechanism, said control lever being adapted to operate said control mechanism upon the releasing of the accelerator pedal to energize said power device and release the clutch, said control lever having limited free movement with relation to said throttle lever upon initial depression of the accelerator pedal and being engageable when its movement is limited, to turn said throttle lever, means operable under predetermined conditions for further limiting independent movement of said control lever to turn said throttle lever at an earlier point with respect to depression of the accelerator pedal from its released position, and automatic means operable independently of said last named means for causing a relative lagging of the movement of the clutch elements toward operative engagement upon depression of the accelerator pedal from its released position.

17. A clutch control mechanism for a motor vehicle power plant including an engine, a clutch, a carburetor, a throttle and an accelerator pedal, comprising a differential fluid pressure operated power device connected to the clutch, a follow-up control valve mechanism for said power device comprising an accelerator-operable valve and a pressure responsive valve controlled in accordance with pressures in said power device, a spring urging said second named valve toward a normal position, a throttle lever fixed to the throttle, a control lever pivoted to said throttle lever at a point remote from the throttle, said control lever having connections to the accelerator pedal and to said first named valve, means responsive to a predetermined condition, and means for utilizing operation of said last named means for controlling the loading of said spring to vary the follow-up action of said valves.

18. A clutch control mechanism for a motor vehicle power plant including an engine, a clutch, a transmission, a carburetor, a throttle and an accelerator pedal, comprising a differential fluid pressure operated power device connected to the clutch, a follow-up control valve mechanism for said power device comprising an accelerator-operable valve and a pressure responsive valve controlled in accordance with pressures in said power device, a spring urging said second named valve toward a normal position, a throttle lever fixed to the throttle, a control lever pivoted to said throttle lever at a point remote from the throttle, said control lever having connections to the accelerator pedal and to said first named valve, said control lever having a limited range of free movement with respect to said throttle lever when the latter is in idling position whereby initial depression of the accelerator pedal from its released position will operate said first valve to start to deenergize said power device prior to the transmission of movement from said control lever to said throttle lever, the relative arrangements of the turning axis of the throttle, the pivot between said levers and the connections on said throttle lever being such that said first named valve is moved relatively more rapidly when the accelerator pedal moves at a given rate during said free range of movement than during the remaining movement of the accelerator pedal, and means responsive to predetermined transmission conditions for changing the loading of said spring.

19. A clutch control mechanism for a motor vehicle power plant including an engine, a clutch, a carburetor, a throttle and an accelerator pedal, comprising a differential fluid pressure operated power device connected to the clutch, a follow-up control valve mechanism for said power device comprising an accelerator-operable valve and a pressure responsive valve controlled in accordance with pressures in said power device, a spring urging said second named valve toward a normal position, a throttle lever fixed to the throttle, a control lever pivoted to said throttle lever at a point remote from the throttle, said control lever having connections to the accelerator pedal and to said first named valve, said control lever having a limited range of free movement with respect to said throttle lever when the latter is in idling position whereby initial depression of the accelerator pedal from its released position will operate said first valve to start to deenergize said power device prior to the transmission of movement from said control lever to said throttle lever, the relative arrangements of the turning axis of the throttle, the pivot between said levers and the connections on said throttle lever being such that said first named valve is moved relatively more rapidly when the accelerator pedal moves at a given rate during said free range of movement than during the remaining movement of the accelerator pedal, means responsive to a predetermined condition, and means for utilizing operation of said last named means for controlling the loading of said spring to vary the follow-up action of said valves.

20. In combination with a motor vehicle power plant comprising an engine, a clutch, a transmission, a carburetor, a throttle and an accelerator pedal; a differential fluid pressure operated power device connected to the clutch, a follow-up control valve mechanism for said power device comprising an accelerator-operable valve and a pressure-responsive valve subject to pressures in said power device to follow-up with respect to said first named valve, a spring urging said second valve toward a normal position against the differential pressures to which said second valve is subjected, mechanical connections between said accelerator pedal, said throttle and said first named valve, and means operable under predetermined transmission conditions for varying the tension of said spring to vary the follow-up action of said valves with respect to each other.

21. In combination with a motor vehicle power plant comprising an engine, a clutch, a transmission, a carburetor, a throttle and an accelerator pedal; a differential fluid pressure operated power device connected to the clutch, a follow-up control valve mechanism for said power device comprising an accelerator-operable valve and a pressure-responsive valve subject to pressures in said power device to follow-up with respect to said first named valve, a spring urging said second valve toward a normal position against the differential pressures to which said second valve is subjected, mechanical connections between said accelerator pedal, said throttle and said first named valve, a solenoid energizable under predetermined transmission conditions, and mechanical connections between said solenoid and said spring to increase the loading of the latter when said solenoid is energized to cause a lagging of the establishment of pressure equalization in said power device and thus cause a consequent lagging of movement of the clutch elements toward operative engagement upon depression of the accelerator pedal.

22. In combination with a motor vehicle power plant comprising an engine, a clutch, a transmission, a carburetor, a throttle and an accelerator pedal; a differential fluid pressure operated power device connected to the clutch, a follow-up control valve mechanism for said power device comprising an accelerator-operable valve and a pressure-responsive valve subject to pressures in said power device to follow-up with respect to said first named valve, a spring urging said second valve toward a normal position against the differential pressures to which said second valve is subjected, mechanical connections between said accelerator pedal, said throttle and said first named valve, means operable under predetermined transmission conditions for varying the tension of said spring to vary the follow-up action of said valves with respect to each other, said connections between the accelerator pedal, said throttle and said first named valve being constructed and arranged to provide for free movement of said accelerator pedal with respect to said throttle during a predetermined range of limited movement of said accelerator pedal adjacent the fully released position thereof to cause said throttle to be opened after initial releasing of the clutch elements for movement toward engaged position, and automatic means for restricting said free range of movement.

23. In combination with a motor vehicle power plant comprising an engine, a clutch, a transmission, a carburetor, a throttle and an accelerator pedal; a differential fluid pressure operated power device connected to the clutch, a follow-up control valve mechanism for said power device comprising an accelerator-operable valve and a pressure-responsive valve subject to pressures in said power device to follow-up with respect to said first named valve, a spring urging said second valve toward a normal position against the differential pressures to which said second valve is subjected, mechanical connections between said accelerator pedal, said throttle and said first named valve, a solenoid energizable under predetermined transmission conditions, and mechanical connections between said solenoid and said spring to increase the loading of the latter when said solenoid is energized to cause a lagging of the establishment of pressure equalization in said power device and thus cause a consequent lagging of movement of the clutch elements toward operative engagement upon depression of the accelerator pedal, said connections between the accelerator pedal, said throttle and said first named valve being constructed and arranged to provide for free movement of said accelerator pedal with respect to said throttle during a predetermined range of limited movement of said accelerator pedal adjacent the fully released position thereof to cause said throttle to be opened after initial releasing of the clutch elements for movement toward engaged position, and automatic means for restricting said free range of movement.

24. A clutch control mechanism for a motor vehicle power plant including an engine, a clutch, a carburetor, a throttle and an accelerator pedal, comprising a power device connected to the clutch, a follow-up control mechanism for the power device, operating connections between said accelerator pedal and said throttle and said control mechanism, said connections and said control mechanism being constructed and arranged to provide a normal operation of said throttle and said control mechanism in a predetermined timed relationship upon operation of said accelerator pedal, automatic means responsive to a predetermined condition, and means responsive to said last named means for varying the follow-up operation of said control mechanism for changing the timed relationship of operation of said throttle and said control mechanism.

25. A clutch control mechanism for a motor vehicle power plant including an engine, a clutch, a carburetor, a throttle and an accelerator pedal, comprising a power device connected to the clutch, a control mechanism for the power device, operating connections between said accelerator pedal and said throttle and said control mechanism, said connections being constructed and arranged to operate said throttle and said control mechanism in a predetermined timed relationship upon operation of said accelerator pedal, and temperature controlled means operable when the vehicle engine is relatively cold for altering the timed relationship of operation between said throttle and said control mechanism whereby said throttle will be cause to initially move from its idling position at a relatively earlier time upon depression of the accelerator pedal.

26. A clutch control mechanism for a motor vehicle power plant including an engine, a clutch, a carburetor, a throttle and an accelerator pedal, comprising a power device connected to the clutch, a follow-up control mechanism for the power device connected to said accelerator pedal and said throttle and being constructed and arranged to provide a normal operation of said throttle and said control mechanism in a predetermined timed relationship upon operation of said accelerator pedal, automatic means responsive to a predetermined condition, and means responsive to said last named means for controlling the follow-up operation of said control mechanism to effect a lagging of the movement of the clutch elements toward operative engagement under predetermined conditions.

27. A clutch control mechanism for a motor vehicle power plant, including an engine, a clutch, a carburetor, a throttle and an accelerator pedal, comprising a differential fluid pressure operated power device connected to the clutch, a control valve mechanism for said power device, said accelerator pedal and said throttle and said control valve mechanism being so connected to each other as to connect said power device to a source of differential fluid pressure upon the releasing of the accelerator pedal to release the clutch and to at least partially deenergize said power device upon initial depression of the accelerator pedal and prior to the opening of the engine throttle, to release the clutch elements for movement toward operative engagement, and means responsive to temperatures of the vehicle engine for causing initial opening of said throttle at an earlier point with relation to deenergization of said power device upon depression of the accelerator pedal from its released position.

28. A clutch control mechanism for a motor vehicle power plant including an engine, a clutch, a carburetor having an automatic temperature-controlled choke mechanism, and an accelerator pedal, comprising a differential fluid pressure operated power device connected to the clutch, a control valve mechanism for said power device, said accelerator pedal and said throttle and said control mechanism being so connected to each other as to connect said power device to a source of differential fluid pressure through said control valve mechanism to release the clutch upon the releasing of the accelerator pedal, and to at least partially deenergize said power device upon initial depression of the accelerator pedal and prior to the opening of the throttle, to release the clutch elements for movement toward operative engagement, and means controlled by said automatic choke mechanism for changing the operative relationship in the connection of the accelerator pedal to the throttle to cause the latter to be opened to initiate engine acceleration after initial depression of the accelerator pedal and prior to the engagement of the clutch elements.

29. A clutch control mechanism for a motor vehicle power plant including an engine, a clutch, a transmission, a carburetor, a throttle and an accelerator pedal, comprising a differential fluid pressure operated power device connected to the clutch, a follow-up control valve mechanism for said power device comprising an accelerator-operable valve and a pressure responsive valve controlled in accordance with pressures in said power device, a spring urging said second named valve toward a normal position, a throttle lever fixed to the throttle, a control lever pivoted to said throttle lever at a point remote from the throttle, said control lever having connections to the accelerator pedal and to said first named valve, and means responsive to predetermined transmission conditions for changing the loading of said spring.

30. A clutch control mechanism for a motor vehicle power plant including an engine, a clutch, a carburetor, a throttle and an accelerator pedal, comprising a differential fluid pressure motor connected to the clutch, a follow-up control valve mechanism for the motor comprising a pair of valve elements constructed and arranged to provide a follow-up action of said motor upon operation of one of said valve elements, said last named valve element being connected to the accelerator pedal and to the throttle, said control valve mechanism being constructed and arranged to provide a normal follow-up action of said motor relative to movement of the throttle upon operation of the accelerator pedal, automatic means responsive to a predetermined condition, and means responsive to said last named means for varying the follow-up operation of said valve mechanism to provide an altered rate of clutch engagement in relation to opening movement of the throttle.

31. A clutch control mechanism for a motor vehicle power plant including an engine, a clutch, a transmission, a carburetor, a throttle and an accelerator pedal, comprising a differential fluid pressure motor connected to the clutch, a follow-up control valve mechanism for the motor comprising a pair of valve elements constructed and arranged to provide a follow-up action of said motor upon operation of one of said valve elements, said last named valve element being connected to the accelerator pedal and to the throttle, said control valve mechanism being constructed and arranged to provide a normal follow-up action of said motor relative to movement of the throttle upon operation of the accelerator pedal, and means responsive to a predetermined transmission condition for varying the follow-up action of said valve mechanism and consequently the follow-up action of said motor to alter the rate of clutch engagement with relation to opening movement of the throttle.

EDWARD G. HILL.
HENRY W. HEY.